(12) United States Patent
Lallinec et al.

(10) Patent No.: US 12,730,275 B2
(45) Date of Patent: Sep. 8, 2026

(54) OPTICAL COMMUNICATION BUNDLE AND ASSOCIATED OPTICAL CABLE

(71) Applicant: ACOME, Paris (FR)

(72) Inventors: Patrice Lallinec, Jullouville (FR); Stephane Mauray, Mortain Bocage (FR)

(73) Assignee: ACOME, Paris (FR)

( * ) Notice: Subject to any disclaimer, the term of this patent is extended or adjusted under 35 U.S.C. 154(b) by 272 days.

(21) Appl. No.: 18/285,740

(22) PCT Filed: Apr. 13, 2022

(86) PCT No.: PCT/FR2022/050700
§ 371 (c)(1),
(2) Date: Oct. 5, 2023

(87) PCT Pub. No.: WO2022/219288
PCT Pub. Date: Oct. 20, 2022

(65) Prior Publication Data
US 2024/0369788 A1 Nov. 7, 2024

(30) Foreign Application Priority Data
Apr. 13, 2021 (FR) ....................................... 2103791

(51) Int. Cl.
*G02B 6/44* (2006.01)

(52) U.S. Cl.
CPC ........... *G02B 6/441* (2013.01); *G02B 6/4486* (2013.01)

(58) Field of Classification Search
CPC ................................ G02B 6/441; G02B 6/448
See application file for complete search history.

(56) References Cited

U.S. PATENT DOCUMENTS 4,234,907 A 11/1980 Daniel
10,018,796 B1 * 7/2018 Cook .................. G02B 6/4403
2003/0044155 A1 3/2003 Maiden
2017/0336566 A1 11/2017 Burek
2018/0074261 A1 3/2018 Burek
2019/0049681 A1 * 2/2019 Bookbinder ......... G02B 6/0281
(Continued)

FOREIGN PATENT DOCUMENTS

GB 2120398 A * 11/1983 ....... B29D 11/00663

*Primary Examiner* — Eric Wong
(74) *Attorney, Agent, or Firm* — Thomas | Horstemeyer, LLP

(57) ABSTRACT

The invention relates to an optical communication bundle (10) comprising one layer (1), said layer (1) including at least three parallel optical fibers (2) which together define a first side of the layer (1) and a second side of the layer (1) opposite the first side, and a weft yarn (3) interlaced with the optical fibers (2) in order to maintain the optical fibers (2) relative to one another, said weft yarn (3) extending alternately on the first side and on the second side of the layer (1), passing through the layer (1) from the first side to the second side and from the second side to the first side. According to the invention, the layer (1) has a position in which it is wound about itself so as to form a bundle in which the optical fibers (2) are non coplanar; and the interlacing between the weft yarn (3) and the optical fibers (2) is adapted to allow the sheet (1) to pass from the wound position into an unwound position in which the optical fibers (2) are coplanar.

8 Claims, 5 Drawing Sheets

(56) References Cited

U.S. PATENT DOCUMENTS

| | | | | |
|---|---|---|---|---|
| 2019/0324197 | A1 | 10/2019 | Lyngsøe | |
| 2020/0271879 | A1* | 8/2020 | Fallahmohammadi | G02B 6/448 |
| 2020/0355882 | A1* | 11/2020 | Takeuchi | G02B 6/4482 |
| 2024/0053561 | A1* | 2/2024 | Kumar | G02B 6/443 |
| 2024/0427080 | A1* | 12/2024 | Chiasson | G02B 6/448 |

* cited by examiner

OPTICAL COMMUNICATION BUNDLE AND ASSOCIATED OPTICAL CABLE

CROSS REFERENCE TO RELATED APPLICATIONS

This application is the 35 U.S.C. § 371 national stage application of PCT Application No. PCT/FR2022/050700, filed Apr. 13, 2022, which application claims the benefit of French Application No. FR 2103791 filed Apr. 13, 2021, both of which are hereby incorporated by reference herein in their entireties.

TECHNICAL FIELD

This disclosure deals with an optical communication bundle and an optical cable comprising at least one such bundle.

PRIOR ART

The document EP3168665 describes a layer comprising optical fibers, and connecting elements used to hold the optical fibers together. In practice, these connecting elements take the form of dots of epoxy acrylate resin adhesive which require curing to ensure their solidification.

The layer can take an unrolled position in such a way as to form a ribbon (the optical fibers are coplanar), and a rolled position such as to form a roll (the fibers are then non-coplanar).

The fact that the layer can take these two positions offers two advantages.

Firstly, the rolled position has the advantage of being compact.

Secondly, the unrolled position lends itself especially well to a connection of the layer to another layer of optical fibers. Specifically, it is easier in the unrolled position to align and position each optical fiber of the layer with an associated optical fiber of the other layer, before soldering them pair-wise in a single step commonly known as "mass fusion splicing".

However, the connecting elements proposed in the document EP3168665 are complex to attach to the optical fibers, which generates a significant overhead in the manufacturing of these fiber optic bundles.

In addition, the connecting elements generally made of acrylate are mechanically fragile and can break during implementation or upon exposure to high temperatures. This generates a loss of unity of the fiber layer.

Another drawback of these connecting elements is that they do not make it possible to easily vary the distance separating two adjacent optical fibers, when the layer is unrolled. This limitation complicates the step of aligning the optical fibers of the layer, which must be done before the optical fibers of the layer undergo mass fusion splicing with other optical fibers. For example, it may be that the optical fibers need to be positioned in parallel grooves of a support before mass fusion splicing, and the distance separating two adjacent grooves does not match the distance between the respective centers of two adjacent optical fibers of the layer. In this case, it can prove necessary to break the connecting elements, which is time-consuming.

SUMMARY OF THE INVENTION

One aim of this invention is to obtain an arrangement of optical fibers which is compact and is easier to subject to mass fusion splicing with other optical fibers.

This aim is achieved by an optical communication bundle comprising a layer, the layer comprising:

- at least three parallel optical fibers, the optical fibers together defining a first side of the layer and a second side of the layer opposite the first side,
- a weft yarn interwoven with the optical fibers to hold the optical fibers together, in which the weft yarn extends alternately over the first side and over the second side of the layer, traversing the layer from the first side to the second side and from the second side to the first side, in which:

- the layer has a rolled-up position in such a way as to form a roll in which the optical fibers are non-coplanar, and
- the interweaving of the weft yarn with the optical fibers is adapted to allow the layer to go from the rolled-up position to an unrolled position in which the optical fibers are coplanar.

The interweaving using the weft yarn has the effect of keeping an organized disposition of the fibers within the layer in its rolled position. The bundle thus has a compact shape.

The interweaving carried out also makes it possible to make the layer go very easily from its rolled position to its unrolled position, which is favorable to mass fusion splicing, without any substantial disorganization of the optical fibers.

Furthermore, the interweaving is advantageous since it can be configured more or less loosely, which makes it possible to adjust the distance separating an optical fiber of the layer from a fiber which is adjacent thereto, while holding the optical fibers together. Consequently, a user has a certain amount of room for maneuver when aligning the optical fibers of the layer in the unrolled position with other optical fibers, before implementing a mass fusion splicing. This room for maneuver is especially advantageous since it makes it possible to easily position the optical fibers in parallel grooves of different dimensions, before the mass fusion splicing.

The bundle for which provision is made can also comprise the following features, taken alone or combined with one another when this is technically possible.

Preferably, the interweaving of the weft yarn with the optical fibers is adapted so that, in the unrolled position, the distance between a first optical fiber of the layer and a second optical fiber of the layer adjacent to the first optical fiber is less than or equal to 150 μm, or less than or equal to 70 μm.

Preferably, the interweaving of the weft yarn with the optical fibers is adapted so that, in the unrolled position, the distance between any given optical fiber of the layer and each optical fiber of the layer adjacent to the given optical fiber is less than or equal to 150 μm, or less than or equal to 70 μm.

Preferably, the bundle further comprises a retaining yarn wound around the roll such as to retain the layer in the rolled-up position.

Preferably, the retaining yarn is wound in a single direction over at least 360 degrees around the roll.

Preferably, the retaining yarn extends helically around the roll.

Preferably, the retaining yarn has a linear mass strictly less than 20 tex, and strictly greater than 1 tex.

Provision is also made, according to a second aspect, for a cable comprising an optical communication bundle according to the first aspect, and a sheath surrounding the optical communication bundle.

The cable according to the second aspect may comprise two optical communication bundles in accordance with the first aspect, the two bundles comprising yarns of different colors.

Provision is also made, according to a third aspect, for a method for obtaining an optical communication bundle, the method comprising:

- interweaving a weft yarn with at least three optical fibers, such as to form a layer in which the optical fibers are parallel together defining a first side of the layer and a second side of the layer opposite the first side, and in which the weft yarn holds the optical fibers together, and extends alternately over the first side and over the second side of the layer, traversing the layer from the first side to the second side and from the second side to the first side,
- rolling the layer into a rolled-up position in such a way as to form a roll in which the optical fibers are non-coplanar.

The obtaining method according to the third aspect can also comprise a step of winding a retaining yarn around the roll in such a way as to retain the layer in the rolled-up position.

Provision is also made, according to a fourth aspect, for a method for connecting a communicating bundle according to the first aspect with additional optical fibers to be connected, the method comprising:

- making the layer go from the rolled position to the unrolled position,
- aligning each optical fiber of the layer with one of the additional optical fibers,
- connecting the aligned optical fibers pairwise, while the layer is in the unrolled position.

DESCRIPTION DES FIGURES

Other features, aims and advantages of the invention will become apparent from the following description, which is purely illustrative and non-limiting, and which must be read with reference to the appended drawings wherein:

FIGS. 1 to 3 are three top perspective views of a layer of optical fibers according to a first embodiment, in an unrolled position.

FIG. 4 comprises four section views of a layer according to a second embodiment at different stages of a method implemented to obtain it.

In all the figures, similar elements bear identical reference numbers.

DETAILED DESCRIPTION OF EMBODIMENTS OF THE INVENTION

Figure 1:
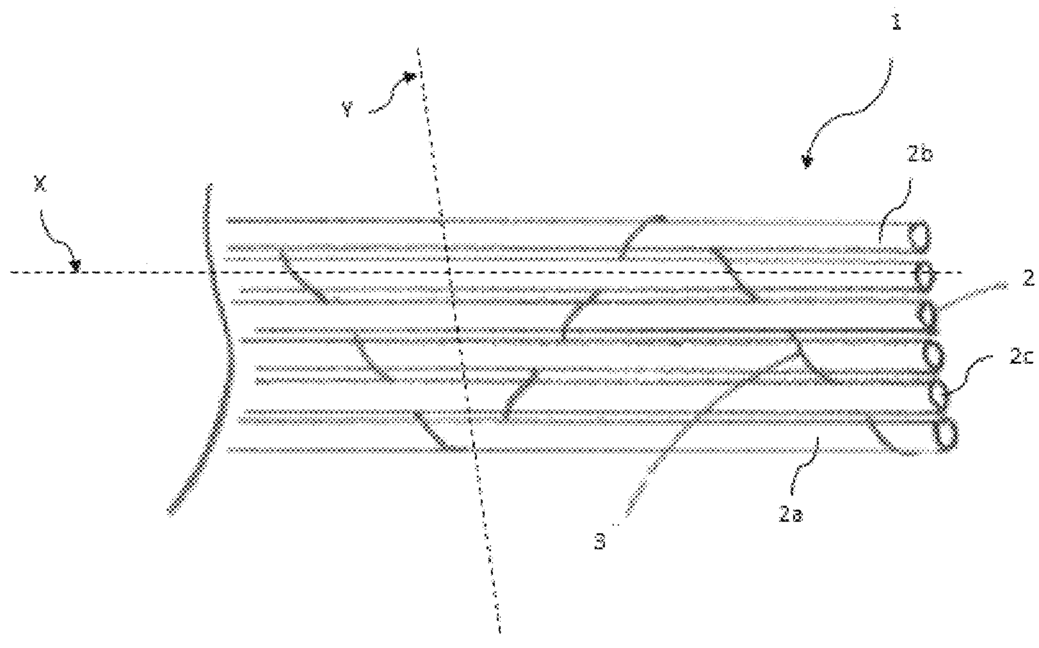

With reference to FIG. 1, a layer 1 comprises N optical fibers 2 (N being greater than or equal to 3). In the embodiment illustrated in FIG. 1, N=6.

Each optical fiber 2 has an elongated form along a longitudinal axis X (for the sake of legibility, only one of these axes X is shown in FIG. 1). Each optical fiber 2 typically comprises a core centered on its longitudinal axis and a sheath surrounding the core (not illustrated).

Typically, each optical fiber 2 has a revolution cylindrical shape (so of circular cross-section).

The optical fibers 2 typically have identical diameters, for example in the order of 250 μm or 200 μm, or even less than 200 μm.

The optical fibers 2 are disposed parallel to one another, i.e. their respective longitudinal axes X are all parallel to one and the same direction, the so-called longitudinal direction.

The layer 1 has a first side (visible in FIG. 1) and a second side opposite the first side (not visible in FIG. 1). The optical fibers 2 together define the first side of the layer, as well as the second side of the layer opposite the first side.

The layer 1 moreover comprises a weft yarn 3 interwoven with the optical fibers 2 to hold the optical fibers 2 together, i.e. limit their relative movement within the layer.

In general, the weft yarn 3 alternately extends over the first side of the layer and over the second side of the layer, traversing the layer from the first side to the second side and from the second side to the first side. The way in which a weft yarn 3 is interwoven with the optical fibers 2 will be described in more detail below.

The layer 1 is able to adopt a so-called "unrolled" position (by contrast with a rolled position which will be described further on), which is shown in FIG. 1. In the unrolled position, the optical fibers are coplanar (ideally, their respective longitudinal axes pass through one and the same plane). In the unrolled position, the layer is substantially flat, and thus forms a ribbon.

In the unrolled position of the layer 1, the optical fibers 2 have different respective positions in a transversal direction perpendicular to the longitudinal direction. This transversal direction is parallel to the axis Y shown in FIG. 1.

By convention, in the remainder of the text it will be considered that the length of the layer 1 is measured in the longitudinal direction, that the width of the layer is measured in the transversal direction when the layer is in the unrolled position, and that its thickness is measured in a direction Z perpendicular to the plane when the layer is in the unrolled position.

Formally, the layer 1 comprises a first extremal optical fiber 2_a_, a second extremal optical fiber 2_b_, and N−2 intermediate optical fibers 2_c_. When the layer is in its unrolled position,

- each intermediate optical fiber 2_c_ is adjacent to two other optical fibers of the layer 1 in the transversal direction;
- each extremal optical fiber 2_a_, 2_b_ is however adjacent to a single intermediate optical fiber 2_c_ of the layer 1 in the transversal direction;
- the two extremal fibers 2_a_, 2_b_ form two opposite ends of the layer 1 in the transversal direction.

Figure 2:
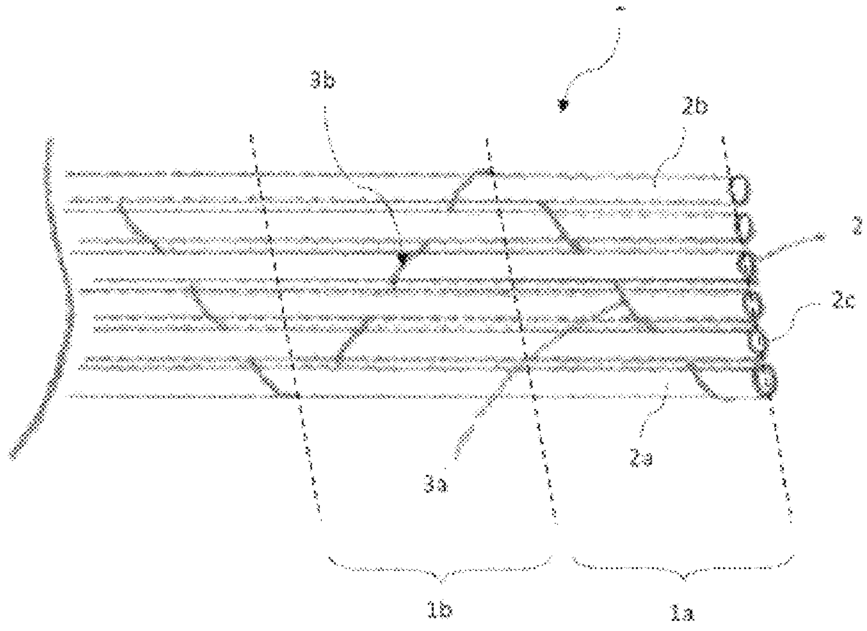
Figure 3:
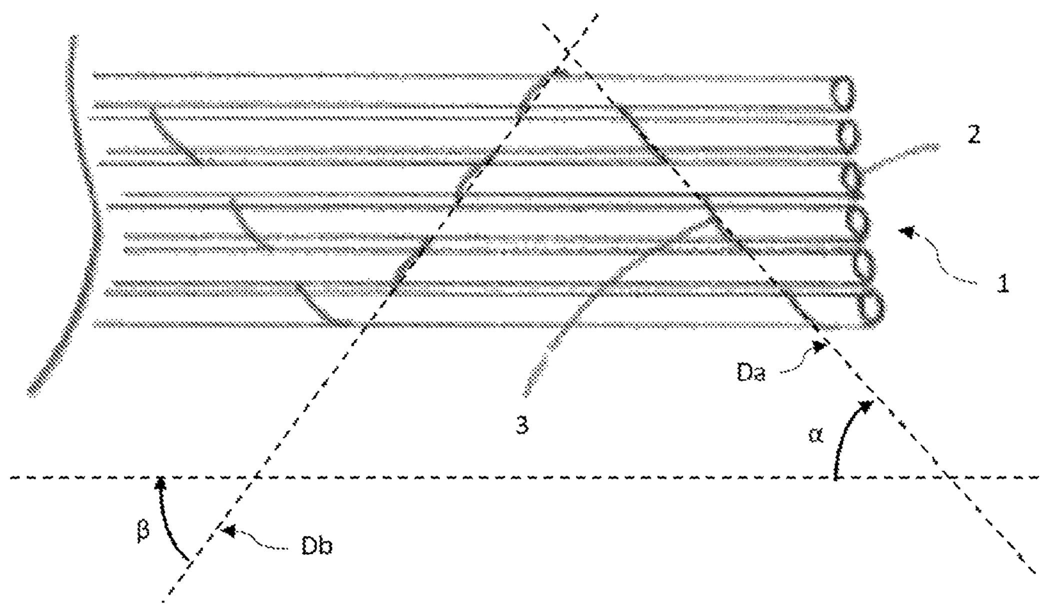

With reference to FIGS. 2 and 3, the layer 1 has different portions in the longitudinal direction X, portions that will hereinafter be referred to as segments.

The layer in particular comprises a first segment 1_a_ and a second segment 1_b_ which is adjacent to the first segment 1_a_ in the sense that it extends the first segment 1_a_ in the longitudinal direction X.

The weft yarn 3 comprises a first yarn portion 3_a_ interwoven with the optical fibers 2 in the first segment 1_a_. The first yarn portion 3_a:_

- extends from the first side of the layer over the first extremal optical fiber 2_a_.

traverses the layer from the first side of the layer to the second side of the layer, passing between the first extremal optical fiber 2*a* and the optical fiber 2*c* adjacent thereto, extends from the second side of the layer over the adjacent optical fiber 2*c*.

traverses the layer from the second side of the layer to the first side of the layer, passing between the adjacent optical fiber 2*c* and the following optical fiber, extends from the second side of the layer over the following optical fiber, and so on until the first yarn reaches the second extremal optical fiber 2*b*.

This trajectory should be read from top to bottom in FIG. 2.

The interweaving of the yarn portion 3*a* is "tight" in the sense that this yarn portion 3*a* passes between each pair of adjacent optical fibers of the layer 1, from the first extremal optical fiber all the way to the second extremal optical fiber.

The first yarn portion 3*a* extending substantially straight in a first direction non-parallel to the longitudinal direction, this first direction being indicated by the straight line Da in FIG. 3. The term "substantially" here refers to the fact that the first yarn 3*a* traverses the layer 1. In other words, even if the trajectory of the first yarn 3*a* appears straight in FIGS. 1 to 3, this first yarn 3*a* extends, due to its interweaving, in a first plane parallel to the straight line Da and perpendicular to the plane (X, Y).

The orientation angle α between the first direction and the longitudinal direction is strictly greater than 0 and strictly less than 90 degrees.

The weft yarn 3 moreover comprises a second yarn portion 3*b*, which extends the first yarn portion 3*a*.

The second yarn portion 3*b* is interwoven with the optical fibers 2 in the second segment 1*b*. The second yarn portion 3*b:* extends from the first side of the layer over the second extremal optical fiber 2*b,* traverses the layer from the first side of the layer to the second side of the layer, passing between the first extremal optical fiber 2*b* and the optical fiber 2*c* which is adjacent to it, extends from the second side of the layer over the adjacent optical fiber, traverses the layer from the second side of the layer to the first side of the layer, passing between the adjacent optical fiber 2*c* and the following optical fiber, extends from the second side of the layer over the following optical fiber, and so on until the first yarn reaches the first extremal optical fiber 2*a*.

This trajectory should be read from top to bottom in FIG. 2.

Once again, the interweaving of the yarn portion 3*b* is "tight" in the sense that this yarn portion 3*b* passes between each pair of adjacent optical fibers of the layer 1, from the second extremal optical fiber all the way to the first extremal optical fiber.

The second yarn portion 3*a* extending substantially straight in a second direction non-parallel to the longitudinal direction, this first direction being indicated by the straight line Db in FIG. 3. As for the first yarn 3*a*, the term "substantially" here refers to the fact that the second yarn 3*b* traverses the layer 1. In other words, even if the trajectory of the yarn 3*b* appears straight in FIGS. 1 to 3, this second yarn 3*b* extends, due to its interweaving, in a second plane parallel to the straight line Db and perpendicular to the plane (X, Y).

The orientation angle ß between the second direction and the longitudinal direction is strictly greater than 0 degrees and strictly less than −90 degrees. The second direction is different from the first direction. In fact, the second plane is secant with the first plane.

Preferably, the orientation angle α formed between the longitudinal direction and the first direction, and the orientation angle ß formed between the longitudinal direction and the second direction have opposite values (α=−ß).

The sum of the lengths of the first segment and of the second segment in the longitudinal direction is preferably less than 50 millimeters, or is between 1 and 15 millimeters.

The two segments 1*a* and 1*b* are of identical length, which equates to saying that the yarn portions 3*a* and 3*b* consume as much layer length to go from one of the extremal optical fibers to the other.

The weft yarn 3 is made of a material chosen from the group consisting in cotton, polyamide, polypropylene and one of their derivatives. These materials have the advantage of resisting exposure to high temperatures (typically greater than 120° C.).

The diameter of the weft yarn 3 is less than the diameter of the optical fibers 2.

Preferably, the weft yarn 3 has a linear mass strictly less than 11 tex. This linear mass can be greater than 1 tex.

The layer 1 may of course comprise other segments in which other portions of the weft yarn 3 repeat the pattern formed by the yarn portions 3*a* and 3*b*. The weft yarn 3 can thus have a sawtooth trajectory in the plane (X, Y) as can be seen in FIGS. 1 to 3.

Figure 4:
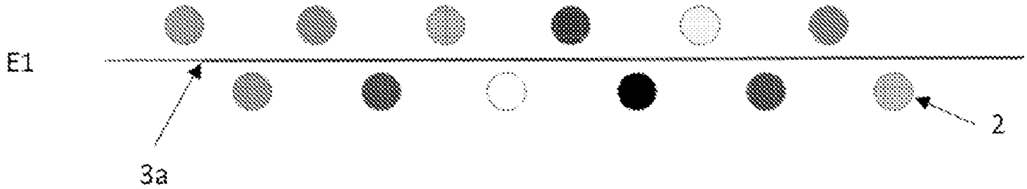
Figure 4:
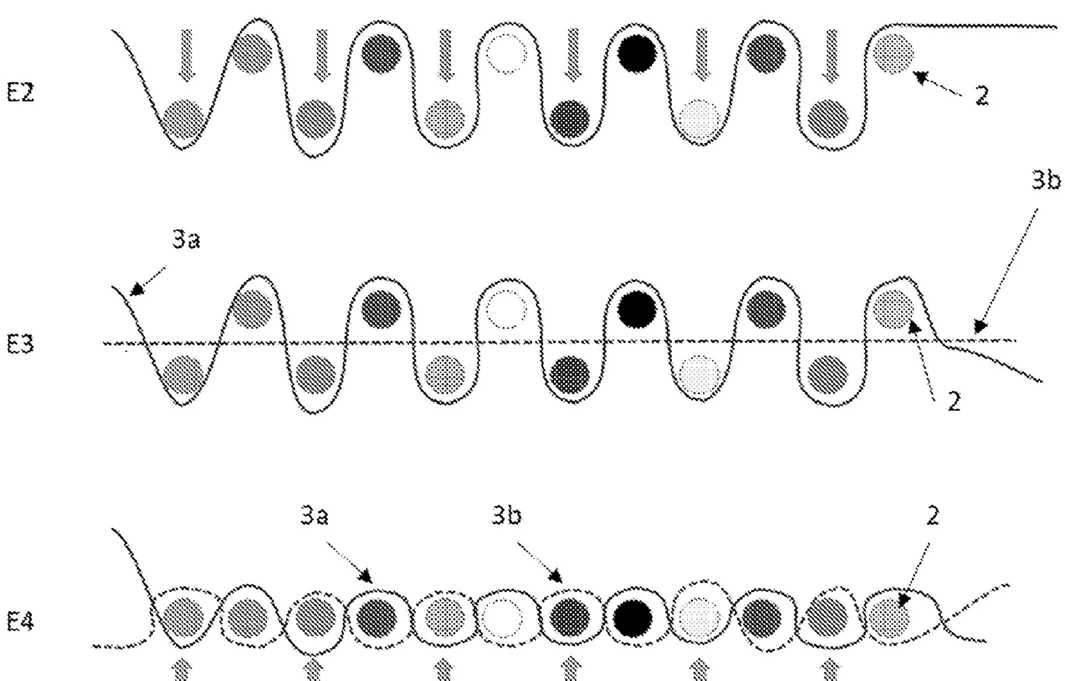

With reference to FIG. 4, a method for obtaining the layer 1 from optical fibers 2 and from the weft yarn 3 comprises the following steps.

In a first sub-step E1, the optical fibers 2, which are disposed in the longitudinal direction, are divided into two rows separated by a space: an upper row and a lower row.

Preferably, two adjacent optical fibers 2 are systematically allocated to different rows, as can be seen in the sub-step E1 of FIG. 4. In this case, the two rows have one and the same number of optical fibers 2, to the nearest fiber. In the embodiment illustrated in FIG. 4, there are N=12. Each row therefore has N/2=6 optical fibers 2. Still in the same allocation scenario, if N was odd, one of the two rows would have one optical fiber 2 more than the other row.

The optical fibers 2 of one and the same row are all coplanar. Thus, the respective longitudinal axes of the optical fibers 2 of the upper row, if there are several, are all in one and the same plane, the so-called upper plane, and the respective longitudinal axes of the optical fibers 2 of the lower row, if there are several, are all in one and the same plane, the so-called lower plane.

The first yarn portion 3*a* is inserted into the space located between the two rows of optical fibers 2, such that this yarn portion 3*a* extends parallel to the upper and lower planes, in the first direction.

In a second sub-step E2, the upper row is moved downward, such that the two rows intersect. During this movement, the optical fibers 2 of the upper row come into contact with the yarn at different points, and cause a deformation of this yarn such that it takes a zig-zag shape, as can be seen in the section views of FIG. 4.

After intersecting, the two rows move away from one another such as to form a second space between one another, for example of a width equivalent to the space previously discussed.

In a third sub-step E3, the second yarn portion 3*b* is inserted into the second space newly formed between the two rows of optical fibers 2, such that the second yarn portion 3*b* extends parallel to the upper and lower planes, in the second direction.

In a fourth sub-step E4, the two rows of fibers are brought closer together such that all the optical fibers 2 are all mutually coplanar. As they are brought closer together, the second yarn portion 3*b* is stressed by the two rows of optical fiber such that the second yarn portion 3*b* takes a zig-zag shape, just like the first yarn portion 3*a*.

A tensile force is optionally applied to the weft yarn 3, such as to tighten its yarn portions 3*a*, 3*b* against the optical fibers 2.

The interweaving of the yarn portions 3*a* and 3*b* with the optical fibers 2 is finished at the end of this fourth sub-step E4.

As can be seen in FIG. 4, the first yarn portion 3*a* and the second yarn portion 3*b* each extend alternately over the first side and over the second side of the layer, traversing the layer from the first side to the second side and from the second side to the first side.

The preceding steps can be repeated for other yarns (or portions of one and the same yarn) to be interwoven with the optical fibers 2 within the layer 1.

In the embodiments illustrated in FIGS. 1 to 4, note the yarn portions 3*a* and 3*b* traverse the layer 1 between each pair of adjacent fibers of the layer. Moreover, each of the optical fibers 2 is confined between the two yarns 3*a* and 3*b* in the views of FIGS. 1 to 3.

The interweaving performed makes it possible to adjust with a certain flexibility the distance that separates two adjacent fibers of the layer in its unrolled position.

Figure 5:
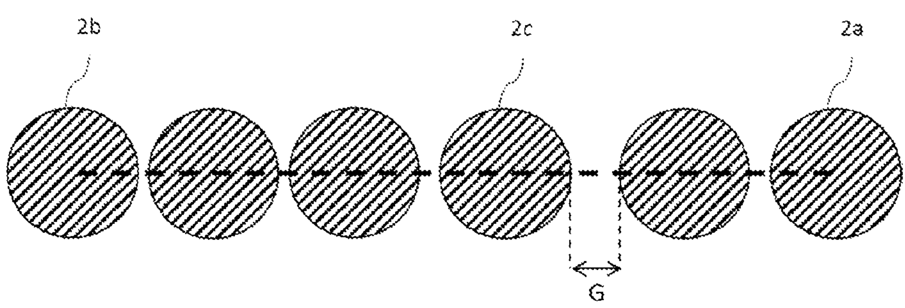
FIG. 5 is a section view of the layer shown in FIG. 1 in its unrolled position.

Preferably, the interweaving of the weft yarn 3 with the optical fibers is adapted so that the layer complies with a specific criterion in its unrolled position: this criterion, illustrated in FIG. 5, consists in requiring the distance G separating one of the optical fibers 1 from another of the optical fibers of the layer 1 which is adjacent thereto to be less than or equal to a maximum value Gmax. In other words, 0≤G≤Gmax. The distance G between two fibers is measured end-to-end whereas the two fibers are parallel; in other words, it corresponds to the width of the interstice between these two fibers, which is in particular traversed, optionally, by the weft yarn 3.

Very preferably, it is ensured that this criterion is verified by each pair of mutually adjacent optical fibers 2 in the layer 1.

To obtain a layer 1 which complies with the preceding criterion, those skilled in the art can follow the following protocol. Those skilled in the art check that the abovementioned distance criterion G≤Gmax is verified by two adjacent optical fibers 2 of the layer 1 in its unrolled position. To do this, those skilled in the art separate the two extremal optical fibers 2*a*, 2*b* from one another until the weft yarn 3 is taut, whereas the layer 1 is in the unrolled position, while ensuring that the fibers remain parallel, and measure the distance G between two mutually adjacent optical fibers 2. If the distance measured is greater than Gmax, those skilled in the art further tighten the weft yarn 3 around the optical fibers and repeat the preceding verification until the criterion G≤Gmax is verified.

Preferably, Gmax is chosen such that Gmax=150 μm. In other words, the distance G is in the range from 0 to 150 μm.

Very preferably, Gmax is chosen such that Gmax=70 μm. The distance G is then in the range from 0 to 70 μm. The layer 1 is not only able to take the unrolled position described previously, but is also able to take a rolled-up position, in such a way as to form a roll.

The interweaving of the weft yarn 3 with the optical fibers make it possible to easily make the layer go from its unrolled position to its rolled position and vice versa, without disorganizing the structure of the layer 1.

Figure 6:
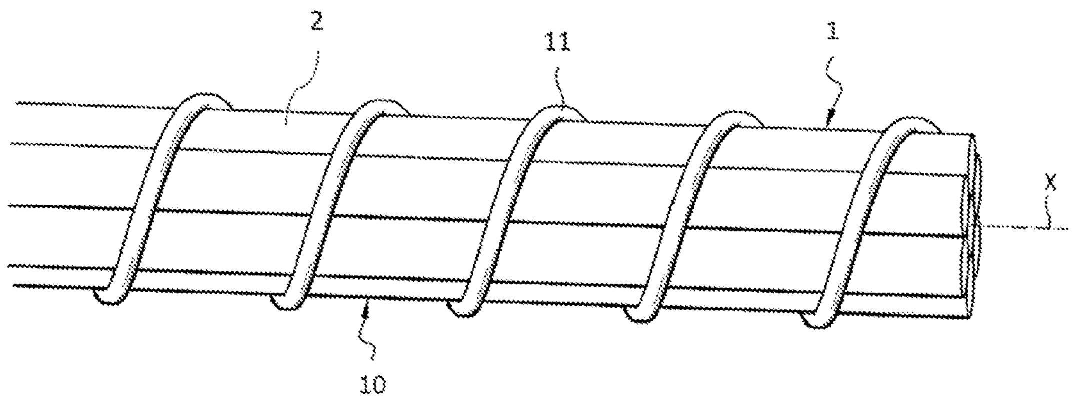
FIG. 6 is a side view of an optical communication bundle according to a first embodiment.
Figure 7:
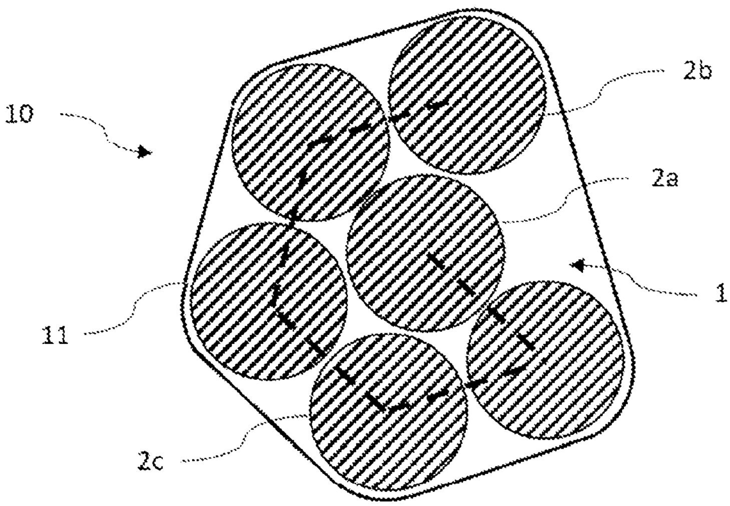
FIG. 7 is a section view of the optical communication bundle according to the first embodiment.

FIGS. 6 and 7 show an optical communication bundle 10 according to an embodiment, which is obtained from the layer 1.

The bundle 10 comprises the layer in the rolled position mentioned previously.

When the layer 1 is in its rolled-up position, the optical fibers 2 remain mutually parallel, but are not coplanar. The roll obtained has the advantage of being more compact than the unrolled layer.

In the remainder of the text, the term "roll" will be used to denote the layer 1 in its rolled-up position.

The roll 1 has a spiral arrangement in a transversal plane perpendicular to the longitudinal direction, as shown in FIG. 7. The first extremal optical fiber 2*a* is the closest to the center of this spiral, while the second extremal optical fiber 2*b* is the furthest from the center of the spiral (the converse also being possible). For the sake of legibility, the weft yarn 3 is not shown in FIG. 7. In FIG. 7, the dotted line indicates the relationships of adjacency between the optical fibers 2, and how the latter reorganize when the layer 1 goes from the rolled position to the unrolled position (shown in FIG. 5).

The bundle 10 moreover comprises a retaining yarn 11 wound around the roll 1, such as to retain the layer in the rolled-up position (in other words in its roll form).

The retaining yarn 11 is distinct from the weft yarn 3.

The retaining yarn 11 has a linear mass preferably strictly less than 20 tex.

The linear mass of the yarn is moreover preferably strictly greater than 1 tex.

The retaining yarn 11 comprises a plurality of non-twisted filaments. Such a configuration allows the first yarn to be laterally squashed, so that its section can go from globally circular to a flattened section.

The retaining yarn 11 has a breaking strength of at least 0.9 Newton.

The retaining yarn 11 is made of one of the following materials, or is a combination of such materials: polyamide (PA), polypropylene (PP), polyester, cotton, aramid, para-aramid.

The retaining yarn 11 extends helically around the roll 1.

The retaining yarn 11 is wound around the roll 1 with a winding pitch less than or equal to 30 millimeters, preferably less than or equal to 15 millimeters. The winding pitch of a yarn is defined in this text as the distance, measured parallel to the longitudinal axis X, that the retaining yarn takes to make a full turn around the axis X.

This winding pitch is greater than or equal to 2 millimeters.

The retaining yarn 11 is wound around the roll 1 over at least 360 degrees in a first single direction of rotation, for example a rotation along S.

Figure 8:
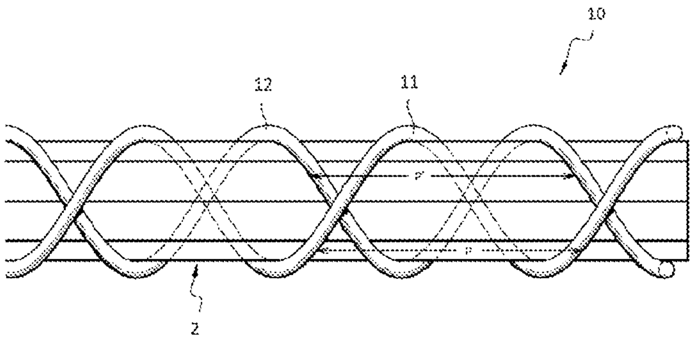
FIG. 8 is a side view of an optical communication bundle according to a second embodiment.

FIG. 8 shows a bundle 10 according to another embodiment, which differs from that shown in FIGS. 6 and 7 by the fact that it further comprises an additional retaining yarn 12 also surrounding the roll 1 to retain the layer 1 in its rolled-up position.

The additional retaining yarn 12 has the same intrinsic features as the retaining yarn 11.

Just like the retaining yarn 11, the additional retaining yarn 12 is arranged so as to extend helically around the roll formed by the layer 1 in its rolled-up position.

The arrangement of the additional yarn 12 with respect to the roll is similar to the arrangement of the retaining yarn 11, with the difference that the additional retaining yarn 12 is wound around the roll 1 over at least 360 degrees along a single second direction of rotation opposite the first direction of rotation of the yarn 11, for example a rotation along Z. In other words, the two retaining yarns 11, 12 are wound in two different directions of winding, so that these two yarns 11, 12 intermittently intersect at least once along the bundle 1.

Preferably, the winding pitch P' of the additional retaining yarn 12 is equal to the winding pitch P of the retaining yarn 11. Such a configuration is of a kind to simplify accessibility to the optical fibers 2 by pushing back the retaining yarns 11, 12.

Figure 9:
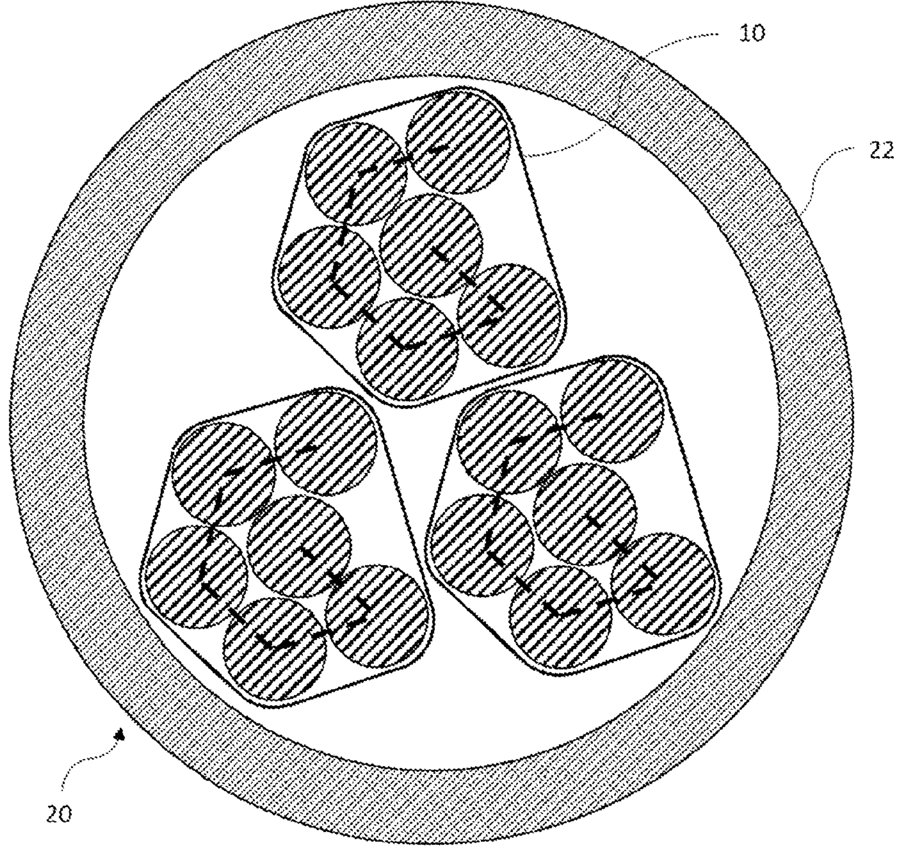
FIG. 9 is a side view showing a section of a cable according to an embodiment.

The optical communication bundle 10 as claimed in any of the embodiments previously described is advantageously included in an optical communication cable 20, an embodiment of which is shown in FIG. 10. The cable 20 comprises a sheath defining an inner space, and at least one optical communication bundle 10 in accordance with the preceding description, arranged in the inner space. In the embodiment illustrated in FIG. 9, three bundles 10 are contained in the inner cavity, it being understood that the number of bundles can of course be different.

When the cable 20 comprises several bundles 10, it is advantageously done so that yarns included in different bundles have different colors. In particular, the following configurations are possible, taken individually or in a combination:

- a weft yarn of a first bundle of the cable and a weft yarn of a second bundle of the cable can have different colors;
- a retaining yarn of the first bundle and a retaining yarn of the second bundle can have different colors;
- a weft yarn of the first bundle and a retaining yarn of the second bundle can have different colors;
- a retaining yarn of the first bundle and a weft yarn of the second bundle can have different colors.

These features have the advantage of allowing an operator to more easily distinguish between bundles. This is especially beneficial in the situation where the user has to select a bundle in a cable to make a connection.

A method for connecting the bundle 10 to other optical fibers (for example forming part of another bundle) comprises the following steps.

A user moves the retaining yarns 11, 12 in relation to the roll 1, such that an end portion of the roll 1 is no longer surrounded by these retaining yarns 11, 12, and thus allows the subsequent unrolling of the layer 1. To do this, the user can cut the retaining yarns 11, 12, or else turn them up along the longitudinal axis X.

The user then unrolls the layer 1, such as to make it go from its rolled-up position to its unrolled position shown in FIG. 1, a position in which the layer is flat and in which the optical fibers are side-by-side. Note that this unrolling can be done only at the end portion of the layer 1, and not necessarily over the whole length of the layer.

Once the layer 1 is in its unrolled position, the distance G between the center of at least one optical fiber 2 of the layer 1 and the center of at least one other optical fiber 2 which is adjacent thereto can be adjusted to a value contained in a range, the upper bound of which is the maximum value Gmax, configured in advance during the interweaving of the weft yarn 3 with the optical fibers 2.

The layer 1 is placed on a first support, before during or after the unrolling step. The first support can for example define parallel longitudinal grooves, each groove having the purpose of receiving one of the optical fibers 2. Such grooves make it possible to stabilize the relative positions of the optical fibers. The insertion of the fibers into such grooves is simplified by the adjustable nature of the distance G, owing to the interweaving done using the weft yarn 3.

Furthermore, having previously configured the interweaving of the weft yarn 3 such as to verify the criterion G≤Gmax for at least one pair of adjacent optical fibers 2 has the advantage of avoiding excessive disorganization of the layer structure, which could present difficulties during the handling of the layer 1 before or during the alignment of the optical fibers 2.

Additional optical fibers to be connected to the optical fibers 2 positioned on the first support are positioned on a second support, for example of the same type as the first support, such that each optical fiber 2 of the layer 1 is aligned with and facing an associated additional optical fiber.

The optical fibers 2 and the additional optical fibers are then soldered pairwise (each optical fiber 2 of the layer is soldered to the additional optical fiber that is associated therewith). These solders are typically made simultaneously (mass fusion splicing).

The invention is not limited to the embodiments illustrated in the figures. Provision can in particular be made for the weft yarn 3 to be interwoven with the optical fibers 2 not by making it traverse the layer 2 from one side to the other, passing between each pair of adjacent optical fibers 2 of the layer 1. On the contrary, provision can be made for the weft yarn 3 to traverse the layer 1 a number of times fewer than N−1 from one extremal optical fiber to the other.

The bundle 10 for which provision is made can be very advantageously applied to connection by mass fusion splicing. However, the bundle 10 can just as well be connected to other optical equipment items via other techniques than mass fusion splicing, such as for example mass connection. Mass connection consists in connecting two fibers, not using a solder, but using a physical connector known as a "Multi-Fiber Push On" in the literature.

The invention claimed is:

1. A method of connecting an optical communicating bundle with additional optical fibers, wherein the optical communication bundle comprises a layer, the layer comprising: at least three parallel optical fibers, a weft yarn interwoven with the optical fibers to hold the optical fibers together, wherein the layer has a rolled-up position in which the layer forms a roll and the optical fibers are non-coplanar, and wherein the weft yarn is interwoven with the optical fibers to allow the layer to go from the rolled position to an unrolled position in which: the optical fibers are coplanar, the optical fibers together define a first side of the layer and a second side of the layer opposite the first side, the weft yarn extends alternately over the first side and over the second side of the layer by traversing the layer from the first side to the second side and from the second side to the first side, and a distance between a first optical fiber of the layer and a second optical fiber of the layer adjacent to the first optical fiber is less than or equal to 150 μm, wherein the method comprises:

making the layer go from the rolled position to the unrolled position, aligning each optical fiber of the layer with one of the additional optical fibers, connecting the aligned optical fibers pairwise while the layer is in the unrolled position.

2. The method of claim 1, wherein the distance between the first optical fiber of the layer and the second optical fiber of the layer adjacent to the first optical fiber is less than or equal to 70 μm when the layer is in the unrolled position.

3. The method of claim 1, wherein a distance between any given optical fiber of the layer and each optical fiber of the layer adjacent to the given optical fiber is less than or equal to 150 μm when the layer is in the unrolled position.

4. The method of claim 1, wherein a distance between any given optical fiber of the layer and each optical fiber of the layer adjacent to the given optical fiber is less than or equal to 70 μm when the layer is in the unrolled position.

5. The method of claim 1, further comprising a retaining yarn wound around the roll such as to retain the layer in the rolled-up position.

6. The method of claim 1, wherein the retaining yarn is wound in a single direction over at least 360 degrees around the roll.

7. The method of claim 1, wherein the retaining yarn extends helically around the roll.

8. The method of claim 1, wherein the retaining yarn has a linear mass strictly less than 20 tex and strictly greater than 1 tex.

* * * * *